Aug. 5, 1952   W. ST. JOHN   2,606,232
COMBINED METER SOCKET AND CIRCUIT INTERRUPTING DEVICE
Filed Feb. 23, 1950   2 SHEETS—SHEET 1

Inventor
WILLARD ST. JOHN
By Wheeler, Wheeler & Wheeler
Attorneys

Aug. 5, 1952 W. ST. JOHN 2,606,232
COMBINED METER SOCKET AND CIRCUIT INTERRUPTING DEVICE
Filed Feb. 23, 1950 2 SHEETS—SHEET 2

Inventor
WILLARD ST. JOHN
By Wheeler, Wheeler & Wheeler
Attorneys

Patented Aug. 5, 1952

2,606,232

UNITED STATES PATENT OFFICE 2,606,232

COMBINED METER SOCKET AND CIRCUIT INTERRUPTING DEVICE

Willard St. John, Birnamwood, Wis.

Application February 23, 1950, Serial No. 145,774

17 Claims. (Cl. 175—223)

This invention relates to a combined meter socket and circuit interrupting device.

The primary object of this invention is to consolidate main circuit control and metering apparatus. In this connection, it is an object of the invention to provide circuit interrupting apparatus unitary with a meter socket. Various embodiments of such apparatus adapted to be used in new installations as well as in existing installations will be hereinafter disclosed.

Another object of the invention is to provide a combined meter socket and circuit interrupting device having a novel removable panel or drawer in which removable elements of the circuit interrupting apparatus are mounted. The drawer carries contact elements which selectively engage fixed complementary contact elements to function as a main switch. The panel further carries overload protection apparatus. The entire circuit interrupting apparatus may be bodily removed from the consolidated structure for replacement, repair and interchange merely by removing the panel or drawer.

A further object of the invention is to provide novel locking means for positively securing the switch elements in engaged or disengaged position.

In this manner all of the main line switching and metering apparatus is consolidated into a compact unitary structure accessible at a single point along the circuit. Where a meter is presently conventionally located outside of a building, by the practice of this invention the fuses and main line switch may be likewise housed outside the building and are accessible without requiring entrance to the building. The practice of this invention makes it possible to terminate electric utility service on the outside of a building or on a centrally disposed pole, as in the case of farm installations and the like.

At an infrequently used building, such as a summer cottage, electric utility service may be disconnected after leaving and securing the building. Furthermore, authorized public officials, such as firemen, may disconnect electric service from a building rapidly without requiring entrance to the building. In all such cases the main line between the meter and the branch circuits is protected by the main overload protective device.

This application is a continuation in part of my co-pending application Serial No. 85,171 filed April 2, 1949 on a Meter Socket Fused Switch which has become abandoned.

Other objects and advantages of the invention will be more apparent to one skilled in the art upon an examination of the following disclosure.

Figure 1:
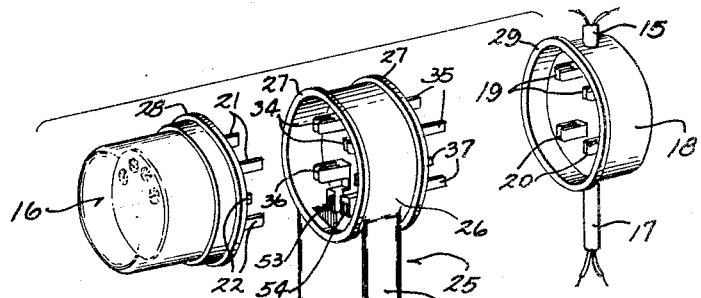
Fig. 1 is a perspective view of a meter, socket and my interposable circuit interrupting device embodying the invention, this embodiment being adapted for installation in conjunction with existing service entrance apparatus, said apparatus being illustrated in spaced relationship with the combined unit.
Figure 11:
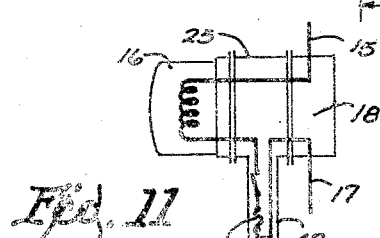
Fig. 11 is a simplified circuit diagram of the electrical circuit of the device shown in Fig. 1.

As best shown in Figs. 1 and 11 electric utility service is normally supplied to a building or the like through an incoming line 15 which is routed through a meter 16 and thence to the load through the line 17. The lines or cables 15 and 17 terminate in a conventional meter base or socket 18 at the respective paired electric contact jaws 19 and 20. It has heretofore been conventional for these contact jaws to engage the complementary contact blades 21 and 22 of the meter 16 which may detachably seat upon the base 18.

Figure 5:
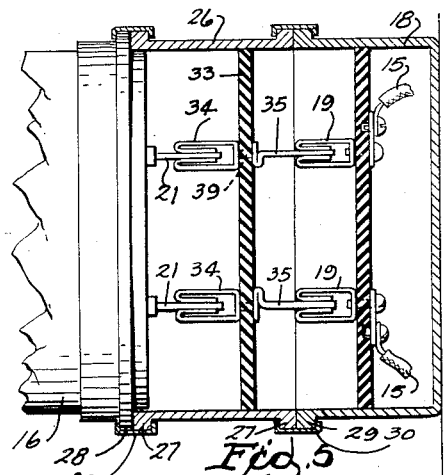
Fig. 5 is a cross sectional view of an interconnected meter, combined intermediate unit and meter base socket, this view being partially taken along line 5—5 of Fig. 4.

In the present invention, however, and more particularly in the embodiment thereof shown in Fig. 1, an intermediate unit indicated generally as 25, and which comprises a combined meter socket and circuit interrupting device, is interposed between the meter base 18 and the meter 16. The combined or intermediate unit 25 comprises a generally cylindrical meter socket housing 26 and a unitary switch or circuit interrupting device casing 47. The meter socket housing 26 is provided with oppositely disposed peripheral flanges 27 which provide seats against which the complementary flange 28 of the meter and flange 29 of the meter base abut to be detachably interconnected by the ring-like collars 30 (Fig. 5).

The meter socket housing 26 is provided with an insulated mounting plate 33 secured to the housing 26 by bolts 31 or the like which securely hold the plate to the tapped ears 32 secured to the housing. The plate 33 serves as a common mount for the aligned contact jaws 34 and contact blades 35, and for the aligned contact jaws 36 and contact blades 37. As best shown in Fig. 5 the paired jaws and blades 34 and 35 are electrically connected through the bridge 39 which passes through the plate 33. Consequently, when the combined or intermediate unit 25 is disposed in operative position between the meter base 18 and the meter 16, electric current will flow without interruption through the aligned contact elements 19, 35, 34 and 21.

Figure 2:
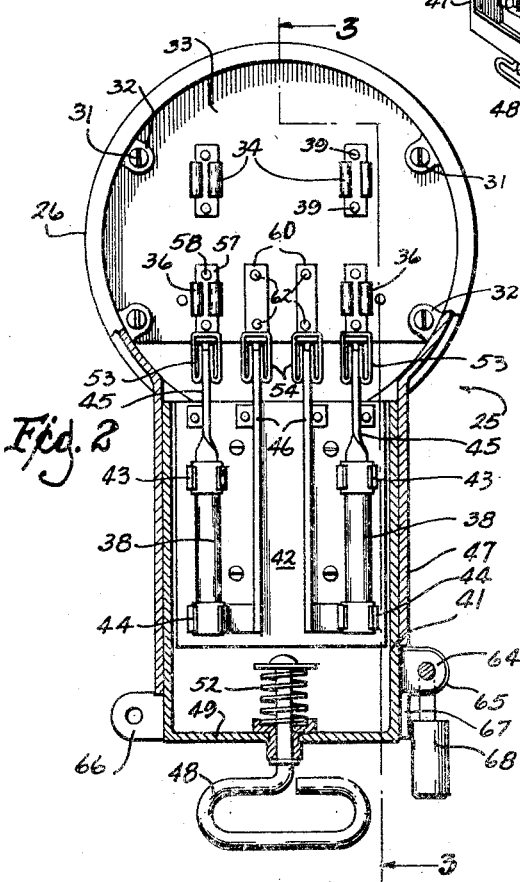
Fig. 2 is an elevation of my combined meter socket and circuit interrupting device, the lower portion of the housing being shown in vertical section along line 2—2 of Fig. 3.
Figure 3:
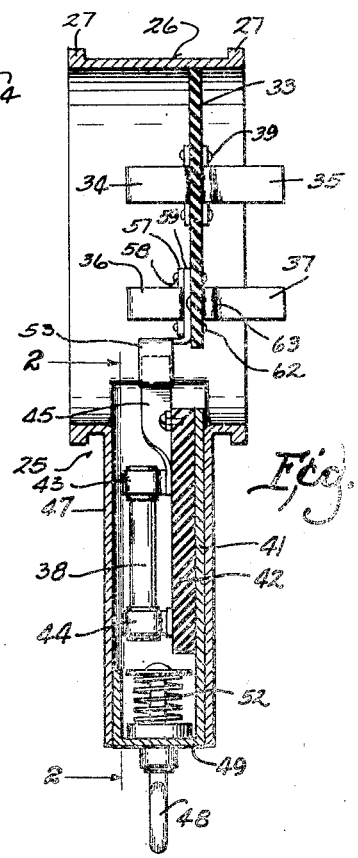
Fig. 3 is a vertical section on line 3—3 of Fig. 2.
Figure 6:
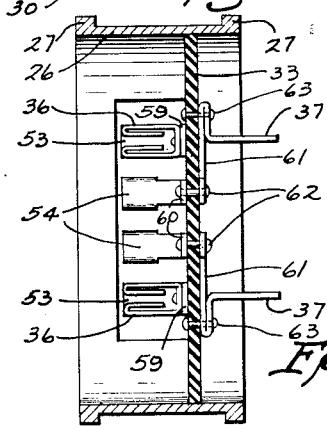
Fig. 6 is a cross sectional view taken through the combined unit only along the line 6—6 of Fig. 4.

However, as best shown in Figs. 2 and 6, the aligned contact jaws 36 and 37 are not directly electrically connected, but are connected only through the switch elements 45, 53, the fuses 38 and switch elements 46, 54.

As best shown in Fig. 2 the main circuit fuses 38 are mounted on a slidable panel or drawer 41 which is housed in closed position by the casing 47. The panel 41 carries an insulated plate 42 upon which is mounted spring clips 43, 44 to receive the capped ends of the cartridge type fuses 38. The respective spring clips 43 and 44 are provided with contact blade elements 45 and 46 which project from the inner end of the panel 41 to comprise the movable elements of a main switch with the stationary jaws 53, 54 mounted on the common insulated plate 33. The stationary jaws are respectively connected to the contact jaws 36 and contact blades 37.

The drawer or panel 41 is further provided with a handle 48 which is mounted reciprocably through the end 49 of the drawer. A compression spring 52 abuts the inside of the drawer and a washer on the inner end of the handle.

A quick pull on the handle compresses the spring and insures the snap action separation of the contact elements of the main switch when the drawer is sharply withdrawn from the casing 47.

The mounting detail of the respective jaws and blades 36 and 37 on the common insulating plate 33 is of interest. As best shown in Figs. 2, 3, 4, and 6, the jaws 36 are provided with vertically aligned opposed flanges 57 which receive the rivets 58 to secure the jaws to the plate. Interposed between the jaws 36 and the plate is a bracket portion 59 of the switch jaws 53, both jaws being physically and electrically connected by the rivets.

The contact blades 37, aligned with the contact jaws 36, are mounted on the opposite side of the common insulated plate 33 and comprise a horizontally formed base portion 61 which receives the oppositely disposed rivets 62 and 63. The transverse disposition of the rivets 58 respecting the rivets 62 and 63, and the spacing of the respective rivets permits the rivets mounting one contact element to span the other contact element and thus avoid electrical contact between the elements, while yet mounting the elements in physical alignment.

The rivets 62 serve also to mount the bracket portions 60 of the switch jaws 54 and to electrically connect the switch jaws 54 with the contact blades 37. In this manner the contact jaws 36 and blades 37 are electrically connected only through the main switch and fuses 38.

Figure 4:
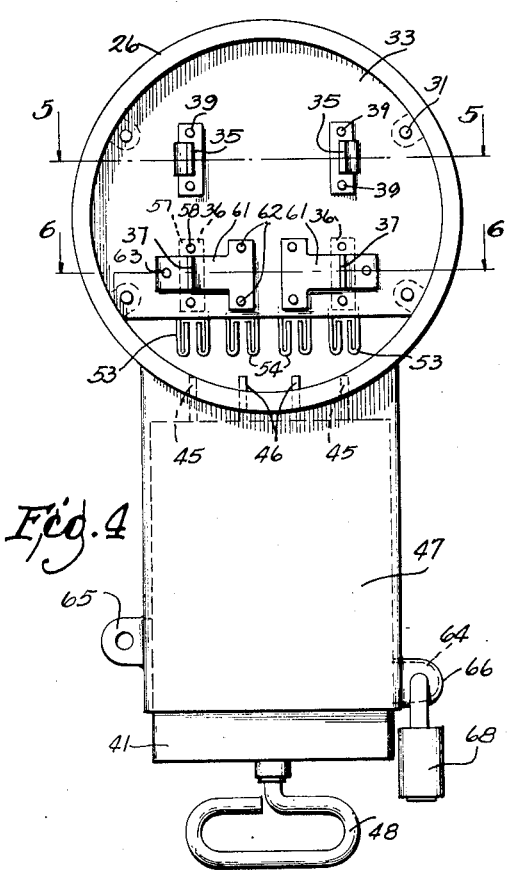
Fig. 4 is a rear elevation of the combined meter, socket and circuit interrupting device shown in Fig. 1.

A novel means for positively locking the circuit interrupting means or switch in closed position, or in open position, is illustrated in Figs. 1, 2, and 4. The removable drawer 41 is provided at one side proximate the drawer end 49 with an apertured ear 64. This ear may be selectively aligned with either the spaced apertured ears 65 on one side of the casing 47 or with the spaced apertured ears 66 on the opposite side of the casing 47. The drawer 41 may be completely removed from the casing 47 and turned to one position or the other to selectively align ear 64 with either of the ears 65 or 66.

Ears 65 and 66 are offset lengthwise of the casing 47 so that when ear 64 is aligned with ears 65 the main switch will be closed, and when ear 64 is aligned with ears 66 the switch will be open. A slot 67 is provided in casing 47 between the ears 65 and the end of the bottom of the casing to provide a way to permit the ear 64 to move to aligned position. In Fig. 2 the panel is shown advanced to switch closing position. A padlock or the like 68 is inserted through the aligned apertures of the registering ears, thus making the switch tamper proof. When the switch is to be locked in open position removable panel 41 is reversed to align ear 64 with ears 66, and to receive padlock 68 as shown in Fig. 4. The casing 47 above the ears 66 provides a stop against which ear 64 will abut to positively prevent closing the switch once the drawer is reversed.

Figure 7:
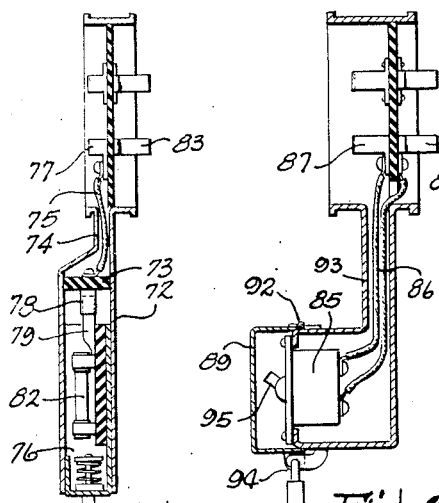
Fig. 7 is a view comparable to Fig. 3 but showing a modified embodiment of the invention in which the switch mounting parts are somewhat re-arranged.
Figures 8, 9, 10:
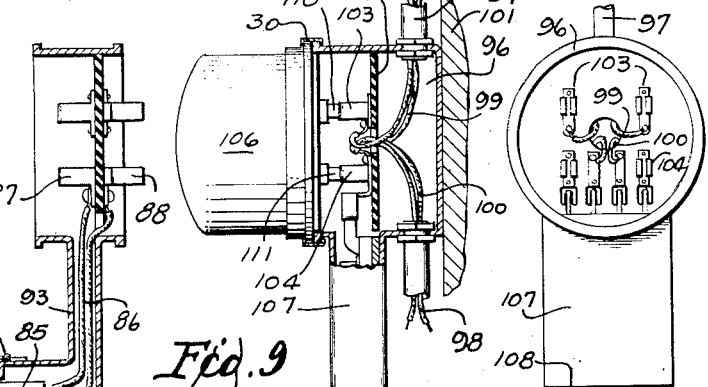
Fig. 8 is a view comparable to Fig. 3 but showing a further modification of the invention wherein the combined intermediate unit comprises a circuit breaker.
Fig. 9 is a view partly in side elevation and partly in vertical section of a combined meter socket and circuit interrupting device embodying the invention, this embodiment being adapted as a new service entrance installation.
Fig. 10 is a front elevation of the device of Fig. 9, the meter being removed.

Modified embodiments of a combined meter socket and circuit interrupting device are illustrated in Figs. 7 and 8. In Fig. 7 thinness of the combined or intermediate structure is made possible by reorienting the disposition of the main switch contact elements to house them within the casing 72 upon a transverse insulating block 73. The switch jaw elements 78 are mounted on the block 73 and are connected through a narrow neck 74 of the casing by wires 75 to the contact jaw elements 77. Switch blades 79 are detachably engaged with jaws 78 and lead to the fuses 82, the blades and fuses being mounted on the removable panel or drawer 76 in the aforedescribed manner. The electrical circuit is completed to the contact blades 83 in a manner similar to that shown in Fig. 2.

In the embodiment of Fig. 8 is a combined meter socket and circuit interrupting device is shown wherein the fuses are replaced by a circuit breaker 85. The circuit breaker is connected through the wires 86 to the respective contact jaws 87 and contact blades 88. A protective door 89 is hinged at 92 to the casing 93 and is locked as indicated at 94. The breaker is provided with a conventional handle 95 for manual switching purposes and to reset the breaker.

In Figs. 9 and 10 an embodiment of the invention adapted for initial installations is disclosed. In this embodiment the meter base 18 and intermediate unit 25 of Fig. 1 are incorporated into a single unitary structure. This structure comprises a meter socket housing 96 which may be readily mounted against a building wall 101 or the like. The line 97 and load 98 circuits are connected through wires 99 and 100 to the contact jaws 103 and 104 which are mounted on the common insulated plate 105. The jaws register with the complementary contact blade elements 110, 111 of the meter 106 when the meter and combined unit are interconnected. Collar 30 provides for the detachable seating of the meter against the peripheral flange on the socket in the manner hereinbefore described.

Housing 96 is provided with a unitary drawer casing 107 which contains the removable drawer 108 having internal connections substantially identical with those hereinbefore described in connection with the embodiment of Fig. 2. In this embodiment, of course, the contact blades at the rear of panel 105 are omitted, and all connections with the line and load wires are made on the front face of panel 105 as shown in Fig. 10.

I claim:

1. For use in an electric circuit having a common metering and switching point, a meter socket having electrically separate terminal connections for series connection with said circuit at said point and contact elements to receive complementary contact elements on a separate meter receivable in said socket, separate circuit interrupting means in series connection with said meter contact elements and said socket contact elements, and a common housing for said meter socket and said circuit interrupting means whereby said circuit interrupting device is unitarily housed with said socket, the portion of the housing for the circuit interrupting means comprising a casing, a panel slidable in and removable from the casing, said panel providing a mounting for said circuit interrupting means whereby said means may be completely removed from the casing, said apparatus further comprising fixed switch elements and movable switch elements, said movable switch elements being mounted on the panel, said fixed and movable switch elements being engaged when the panel is advanced to a selected housed position within the casing and being disengaged when the panel is withdrawn from said selected housed position.

2. The apparatus of claim 1 further provided with means for locking said panel in either advanced or withdrawn position.

3. The apparatus of claim 2 wherein said locking means comprises ears at opposite sides of the casing, said ears being mutually offset in the direction of panel movement, and an ear on the panel registering with one of said ears when the panel is advanced and with the other of said ears when the panel is withdrawn, said panel being reversible intermediate registration with one and the other of said ears.

4. Electrical circuit interrupting apparatus adapted for physical connection with a separate electric meter at a common metering and switching point in an electric circuit, said apparatus comprising a meter socket housing, said housing being provided with spaced electrically separate terminal connections for series connection with said circuit and with electric contact elements registering with complementary contact elements on the meter, circuit interrupting means separate from said contact elements but in series connection with said meter and said terminal connection, a casing unitary with the meter socket housing, and a removable panel slidable in the casing, said circuit interrupting means comprising a switch having fixed elements and movable elements mounted on the panel.

5. The device of claim 4 wherein the meter socket housing is provided with an insulated plate, said meter contact elements being mounted on the plate and said fixed switch elements being mounted on said plate.

6. In a service entrance installation including a meter having projecting electric contact blades and a meter base having aligned electric contact jaws, said base being also provided with spaced terminal connections for series connection with the circuit of said service, circuit interrupting apparatus comprising an interposable combined meter socket and circuit interrupting device unit, said combined interposed unit being provided with a plurality of oppositely projecting aligned contact blades and jaws, at least one of said plurality being directly connected and at least one other of said plurality being insulated, and circuit interrupting means within said interposed unit having connections with said insulated blade and jaw to electrically connect said blade and jaw through said means.

7. The device of claim 6 wherein the circuit interrupting means comprises a switch, said switch comprising a switch element fixed to the unit and a switch element movable respecting the unit, said unit being further provided with a removable panel upon which the movable switch element is mounted.

8. A socket for a separate meter having projecting electric contact blades, said socket comprising a housing having a seat for the meter, contact jaws mounted in the housing for detachable connection with the meter contact blades, circuit interrupting means in the socket and normally in series connection with said meter, said socket being provided with electrically separate terminal connections for series connection with said meter, circuit interrupting means and a circuit at a common metering and switching point in said circuit, said socket being further provided with a portion unitary with the housing and enclosing said circuit interrupting means.

9. The device of claim 8 wherein said circuit interrupting means comprises a switch having an element fixed to the socket, a movable element, said socket being provided with a slidable panel in the portion enclosing the circuit interrupting means and upon which the movable switch element is mounted.

10. In a device of the character described including a meter and meter base having aligned electrical contact elements, an intermediate unit removably interposed between said base and meter, said intermediate unit being provided with paired aligned electric contact elements complementary with the elements on the meter and base, at least one of said pairs being directly electrically connected and another of said pairs being electrically insulated, a common mounting plate upon which the opposite sides of which the respective elements of said insulated pair of contact elements are mounted, the respective elements of said pair having mutually transverse mounting portions spanning the axis of alignment of said elements.

11. For use in an electric circuit having a common metering and switching point and an electric meter base and a separate meter electrically and mechanically attachable to said base at said point, said meter base having electrically separate terminal connections for series connection with said circuit at said point, an interposable manually operable safety shut-off switch physically and electrically insertable between the meter and said base, said interposable switch having series connection with said base terminals and with said meter the series electric connections including fixed and movable contact elements housed within a tamper-proof housing one portion of which comprises a drawer-like manually movable member in which said movable contacts are attached for bodily removal with said drawer from said housing; said housing and said drawer being provided with spaced interlocking means and said drawer being alternatively receivable in said housing in either of said two different positions for interlock of said means in switch open or switch closed position.

12. For use in an electrical circuit having a common metering and switching point and provided at such point with a meter base having a meter receiving socket and supply line and service line terminals for a plug-in meter with contact prongs; an interposable housing element having a portion mechanically complementary to said socket and a first contact for electrical connection with a supply contact of the meter socket and a meter contact in series connection with said first contact, a second contact for electrical connection with a service line contact of the meter socket, a corresponding meter contact insulated from said second contact, a circuit controller housing mechanically connected with said interposable housing element for handling unitarily therewith, and a circuit controller in said controller housing and comprising a switch blade and stationary contact in electrical connection respectively with said second contact and the corresponding insulated meter contact.

13. The device of claim 12 in which said circuit controller housing comprises a drawer guide and a drawer slidable therein to and from a position in said housing, the said switch blade being mounted on the drawer for bodily removal from the controller housing.

14. The device of claim 13 in which said drawer is reversible in said guide, the guide and drawer having locking means registerable in open and closed circuit positions of the drawer as the drawer is reversed.

15. The device of claim 13 wherein the drawer has a handle mounted on the drawer for independent movement in the direction in which the drawer slides, and a spring holding said handle in a position normally retracted.

16. A combined switch and mount for a demountable meter having plug-in contacts, said mount comprising, in combination, a mounting housing member having a mechanical meter support and meter anchoring means, four electrical contacts within said member positioned to receive the contacts of a mounted meter, supply line terminals electrically connected to first and second contacts within said member, service line terminals on said housing member, a circuit controller housing physically unitarily connected with said housing member, and a circuit controlling means comprising relatively fixed and movable contact elements having electrical connection within said housings with said service line terminals and said third and fourth contacts respectively, whereby the supply and service line terminals are normally connected through the meter and controlling means, such connection being breakable by said movable contact elements and also by meter removal.

17. The device of claim 16 in which the fixed contact elements are mounted in one of said housings, and in further combination with a drawer for which the controller housing provides a guideway, the movable contact elements of the circuit controlling means being mounted on the drawer for movement along said guideway to and from a position of electrical engagement of the movable contact elements with the fixed contact elements.

WILLARD ST. JOHN.

REFERENCES CITED

The following references are of record in the file of this patent:

UNITED STATES PATENTS

| Number | Name | Date |
|---|---|---|
| 1,269,996 | Bartlett | June 18, 1918 |
| 1,934,498 | Guedon | Nov. 7, 1933 |
| 2,001,051 | Bruno | May 14, 1935 |
| 2,154,411 | Road | Apr. 11, 1939 |
| 2,249,075 | Young | July 15, 1941 |
| 2,255,122 | Markley | Sept. 9, 1941 |
| 2,423,938 | Johansson | July 15, 1947 |

FOREIGN PATENTS

| Number | Country | Date |
|---|---|---|
| 422,716 | Great Britain | Jan. 17, 1935 |
| 103,560 | Australia | Apr. 17, 1938 |